United States Patent [19]
Johnston

[11] B 3,913,406
[45] Oct. 21, 1975

[54] DIGITAL PULSE REBALANCE ACCELEROMETER

[75] Inventor: James V. Johnston, Huntsville, Ala.

[73] Assignee: The United States of America as represented by the Secretary of the Army, Washington, D.C.

[22] Filed: Aug. 2, 1973

[21] Appl. No.: 385,210

[44] Published under the Trial Voluntary Protest Program on January 28, 1975 as document no. B 385,210.

[52] U.S. Cl. .............. 73/516 R; 73/503; 73/517 B
[51] Int. Cl.² .......................................... G01P 15/08
[58] Field of Search .......... 73/517 B, 516 R, 517 R, 73/514, 503

[56] References Cited
UNITED STATES PATENTS

| | | | |
|---|---|---|---|
| 2,591,921 | 4/1952 | Cosgriff et al. | 73/516 R |
| 2,869,851 | 1/1959 | Sedgfield et al. | 73/517 B |
| 3,068,704 | 12/1962 | Parker | 73/516 R |
| 3,109,310 | 11/1963 | Slater | 73/516 R |
| 3,111,036 | 11/1963 | Kistler | 73/517 B |
| 3,132,520 | 5/1964 | Wing | 73/516 R X |
| 3,175,404 | 3/1965 | Entin | 73/516 R |
| 3,558,946 | 1/1971 | Cory | 73/516 R X |
| 3,702,073 | 11/1972 | Jacobs | 73/517 B |

Primary Examiner—James J. Gill
Attorney, Agent, or Firm—Nathan Edelberg; Robert P. Gibson; Jack W. Voigt

[57] ABSTRACT

The pulse rebalance accelerometer is an acceleration sensing device for measuring vehicle motion and includes a free floating proof mass which is rotated or spun on the acceleration sensitive axis. The proof mass is rotated on hydrodynamic bearings which provide frictionless support for axial motion of the mass. A capacitance type pickoff is located at each end of the rotation shaft and sense displacement of the proof mass, thereby controlling the amount of electrical pulses which feed into torquers to restore the proof mass to the center position. The amount of pulses required to restore the proof mass is proportional to the magnitude of the applied acceleration.

2 Claims, 2 Drawing Figures

DIGITAL PULSE REBALANCE ACCELEROMETER

BACKGROUND OF THE INVENTION

Previous pulse rebalance accelerometers have required some form of a pivot or flexure member that allows some small motion of the proof mass. In the case of the pivot, only very light loads or little vibration could be tolerated due to the delicate assembly of the jewel and pivot. The jewel was required to constrain the proof mass so that only rotation about the pivot axis was allowed. No other motion could be tolerated since it would create an apparent shift of the proof mass support axis. If the jewel fitted too close, large frictional forces were developed, again creating errors. The flexible hinge approach solves most of these problems but it suffers from temperature variations and cross axis coupling. With either mechanization, errors are created when the accelerometer case is rotated, as is done in some missile systems. The rotation, which is perpendicular to the proof mass motion axis, results in an error called acceleration spin sensitivity. The pulse rebalance accelerometer completely overcomes these prior art problems.

SUMMARY OF THE INVENTION

The apparatus of the present invention is a device for measuring the rate of change of velocity and producing an output signal proportional thereto. In the digital pulse rebalance accelerometer, vehicle motion is measured by sensing vehicle accelerator. A free floating proof mass is rotated on frictionless, hydrodynamic bearings for axial motion of the mass. The hydrodynamic bearing is not equipped with thrust pads and is, therefore, constrained by electrical torquing methods. The proof mass is completely supported free of the case. There are no springs or wires attached to the proof mass to cause restraints. Since the proof mass is spinning at a high speed (in excess of 24,000 RPM) the case can be rotated around the proof mass spin axis without any spin sensitivity effects. The proof mass is built symmetrical and, as the temperature changes, the length of the mass will change but neither its weight nor any spring constants normally associated with accelerometers will change since only the rebalance forces keep the mass centered. Since the mass is spinning, all nonsymmetrical unbalances of the proof mass are averaged over each revolution of the mass and do not contribute error signals.

DESCRIPTION OF THE PREFERRED EMBODIMENT

Figure 1:
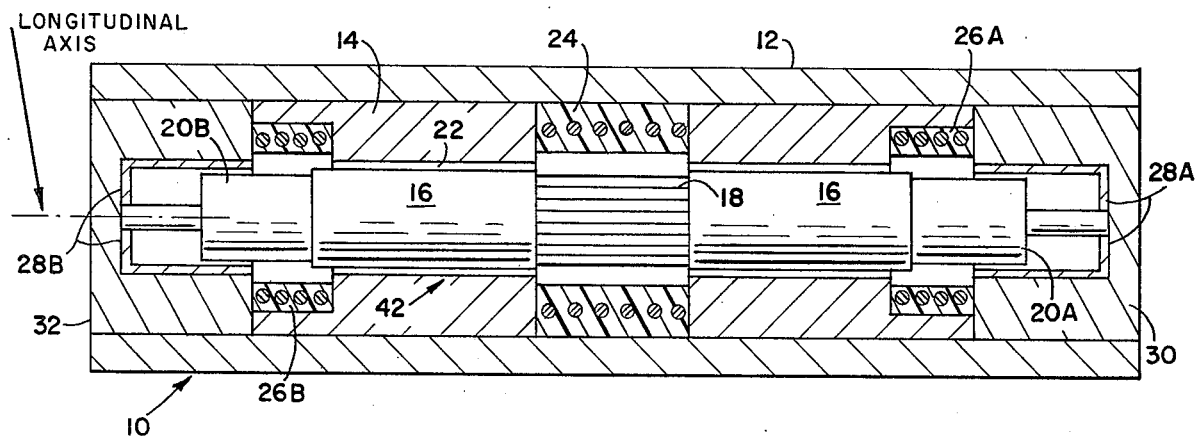
FIG. 1 is a sectional view of a preferred embodiment of the digital pulse rebalance accelerometer.
Figure 2:
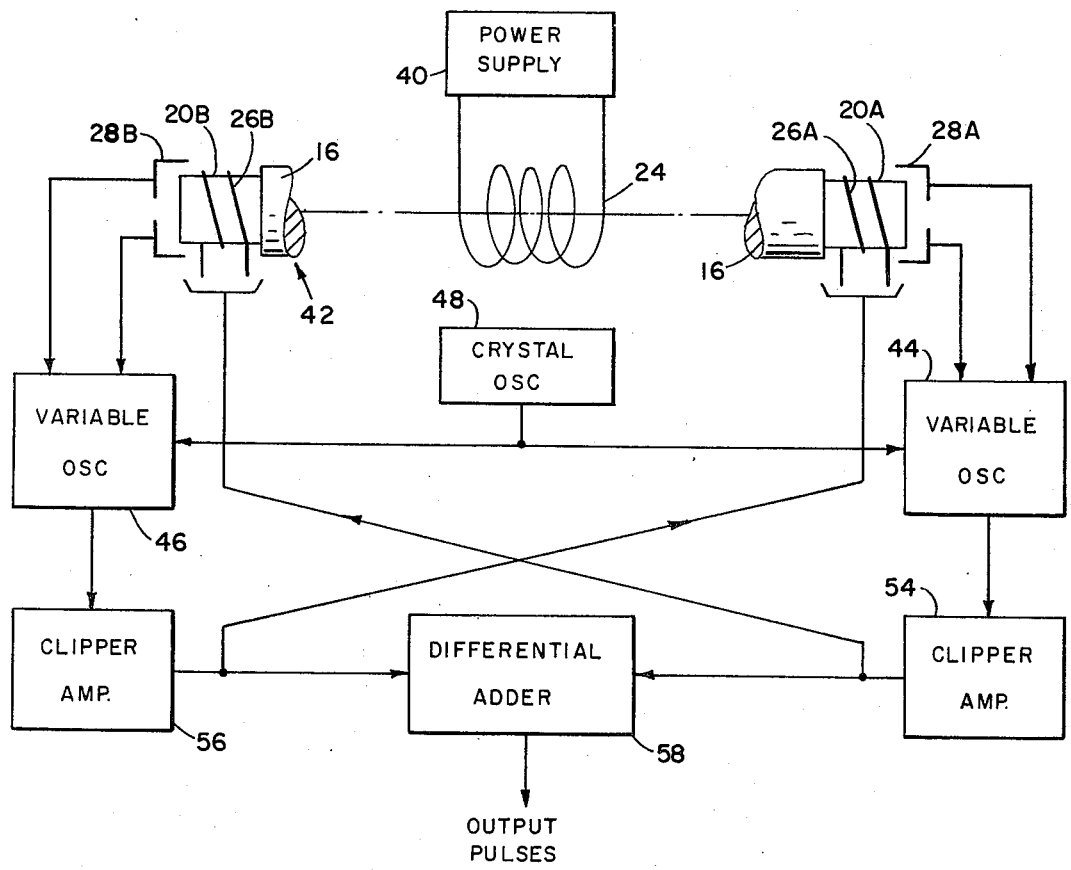
FIG. 2 is a simplified electrical circuit diagram of the accelerometer with associated circuit components.

Referring now to the drawings wherein like numerals represent like parts in the figures, there is disclosed a preferred embodiment of the invention in FIGS. 1 and 2. FIG. 1 discloses a sensing element 10 having a housing 12 which is sealed and maintains alignment of all components therein. A cylindrical hydrodynamic stator 14 is supported within housing 12. Stator 14 is generally of ceramic material. An axial rotor 16 is supported within stator 14 and forms the shaft which is integral with a hysteresis motor 18. Motor 18 is mounted substantially midway along the shaft. Magnetic metal rings 20A and 20B are mounted on respective ends of the shaft. An air bearing gap 22 encompasses rotor 16, hysteresis ring 18 and magnetic metal rings 20. The motor primary winding 24 is supported by the ceramic stator substantially centrally along the accelerometer longitudinal axis, encompassing the hystersis motor ring 18. Torque windings 26A and 26B are supported by the ceramic stator and disposed adjacent magnetic rings 20A and 20B respectively. Split cups 28A and 28B are supported by the stator at respective ends of rotor 16 and are positioned to encompass an end portion of respective magnetic metal rings 20A and 20B. These cups do not hinder rotational and lateral movement of the shaft ends within the cups, and provide the capacitive pickup plates for the accelerometer. End housing members 30 and 32 are used to seal the accelerometer and hold the capacitive pickup plates in position.

As shown in FIG. 2 a power supply 40 is coupled across primary motor winding 24 for developing an electromagnetic field in the motor winding and initiating rotation of the shaft through the hystersis motor ring 18. The axial rotor 16, hysteresis motor ring 18, and magnetic metal rings 20A and 20B function as a proof mass 42 which starts to rotate about its longitudinal spin axis when the rotating electromagnetic field is developed by the spin motor winding 24. As proof mass 42 starts to rotate a hydrodynamic gas film bearing is generated around the circumference of the proof mass. As soon as the proof mass is supported on the gas bearing, it is free to move along its longitudinal axis. When a specific force of acceleration is applied in either direction along the longitudinal axis of the housing, the free floating proof mass will attempt to remain stationary within the housing. As the housing and ceramic stator 14 move along the axis in the direction of motion, the floating proof mass will appear to shift in the opposite direction, causing the metal magnetic rings 20A and 20B to shift into or out of respective capacitive pickup cups 28A and 28B, changing the capacity of the output pickup signals.

Capacitive cups 28A are coupled to a variable oscillator 44 which provides an output frequency that changes as the capacity of the cups vary. Similarly capacitive pickup cups 28B are coupled into a variable oscillator 46 for varying the output frequency of oscillator 46 as the capacity between the cups varies. A crystal oscillator 48 has an output coupled to both oscillators 44 and 46 for controlling the variable oscillators. Output signals from respective variable oscillators 44 and 46 are coupled to clipper amplifiers 54 and 56 for limiting the amplitude thereof. Output signals from clipper amplifiers 54 or 56 are coupled as respective inputs of a differential adder or difference detector circuit 58 which provides an output signal that is proportional to the accelerator of the housing assembly. An output of clipper amplifier 54 is also coupled back to torque winding 26B and an output of amplifier 56 is coupled back to torque winding 26A to develop a field for restoring the floating proof mass to the center, balance position.

In operation of the accelerometer, power supply 40 is activated to create a rotating electromagnetic field in the spin motor winding and thereby starts rotation of proof mass 42 about its longitudinal spin axis. As proof mass 42 starts to rotate, hydrodynamic gas film bearing 22 is generated by rotation of the shaft and supports the proof mass free of contact with adjacent housing structure. Applying a specific force of acceleration along its longitudinal axis of the housing, for example, moving the housing in the direction of capacitive plates 28B results in the floating proof mass 42 appearing to shift toward capacitive cups 28A. Magnetic metal ring 20A will translate further into capacitive cups 28A and increase the capacity of the pickup signal which is fed into oscillator 44, causing that oscillator to decrease its natural frequency. (The natural frequency is controlled by crystal oscillator 48.) At the same time, metal ring 20B is retracted from the capacitive pickup cups 28B causing that capacitance to decrease, thereby increasing the frequency of oscillator 46. The variable oscillator outputs are amplified and clipped to produce a square wave pulse. The output of oscillator 44, coupled through amplifier 54 has a lower pulse rate than the output of amplifier 56. The output of amplifier 54 is coupled to torque coil 26B. This coil acts as a solenoid and applys more energy across magnetic metal ring 20B in a direction to restore the floating proof mass to the center or equilibrium position within the housing. The square wave output of amplifier 56 is the higher frequency signals and is coupled to coil 26A. Since a lower repetition rate of restoring pulses are coupled to coil 26B, this coil dominates in providing restoring action to the proof mass. Similarly the output of clipper amplifier 56 is coupled to torque winding 26A and provides the stronger restoring signal when movement of the accelerometer is in the opposite direction. In response to input signals from amplifiers 54 and 56, differential adder 58 provides output pulses whose quantity is proportional to acceleration of the accelerometer. As a constant velocity is obtained and acceleration reduces to zero, the electromagnetic field developed by the torque coils is gradually reduced. The restoring forces tend to equally space the magnetic rings 20 within coils 26 to rebalance the accelerometer. When zero acceleration is present, the electrical rebalance system has equal pulsing from both ends which results in a zero output from the adder. Thus there is no zero shift or no offset bias.

The digital pulse rebalance accelerometer produces output voltage pulses which are proportional to the rate of change of velocity of the housing. The accelerometer can be fixed to a missile or other vehicular body to provide acceleration information therefor in a specific direction. The accelerometer can be mounted on a stabilized platform to measure acceleration along a lateral plane and it may be used to initiate or terminate an action, such as cutting off a rocket motor, at a desired point of acceleration. It is apparent that various modifications and embodiments of this invention may be made by those skilled in the art without departing from the scope and spirit of the foregoing disclosure. Accordingly, the scope of the invention should be limited only by the claims appended hereto.

I claim:

1. A digital pulse rebalance accelerometer for measuring acceleration of a body and comprising: a housing assembly having an elongated inner cylindrical chamber, a primary motor winding disposed around a portion of the inner wall of the chamber for developing a rotational electromagnetic field across said chamber, rotor means having a longitudinal axis coaxial with said chamber and disposed within said chamber for unencumbered rotation and translation, an air gap encompassing said rotor for isolating said rotor from surrounding housing structure, a hysteresis motor ring disposed around a central portion of said rotor and disposed within the plane of said rotational electromagnetic field for rotating said rotor, first and second split cup, capacitive, pick-offs encompassing respective first and second end portions of said rotor for responding to changes in capacitance at respective rotor ends, first and second torque coils adjacent respective pick-offs and disposed around the inner annular surface of the chamber encompassing a portion of said rotor for coupling electromagnetic energy to respective ends of said rotor, said rotor being constrained only by the hydrodynamic air gap and electromagnetic forces, said rotor ends having, respectively, a magnetic metal ring forming the terminal end portion for changing the capacitance of said split cups in response to longitudinal motion of the rotor and for providing motor restoration forces in response to electromagnetic energy coupled through said torque coils, a power supply for activating said primary motor winding and thereby imparting rotation to the rotor, differential means coupled to said first and second capacitance pick-off cups for providing differential output pulses in proportion to change in capacitance at the rotor ends indicative of changes in velocity of the housing assembly, a first oscillator and clipper amplifier serially connected between said first capacitive cups and said differential means, a second oscillator and clipper amplifier serially connected between said second capacitive cups and said differential means; and wherein said first clipper amplifier has an output coupled to said second torque coil for coupling electromagnetic energy thereto, and said second amplifier has an output coupled to said first torque coil for coupling energy pulses thereto.

2. An accelerometer as set forth in claim 1 and further comprising a crystal oscillator coupled to said first and second variable oscillator for providing a fundamental oscillating frequency thereto.

* * * * *